US012614179B2

(12) United States Patent
Sheng et al.

(10) Patent No.: US 12,614,179 B2
(45) Date of Patent: Apr. 28, 2026

(54) CUSTOMIZABLE INTERMEDIARY PLATFORM FOR CONNECTING ENTITIES

(71) Applicant: Stripe, LLC, South San Francisco, CA (US)

(72) Inventors: Yiran Sheng, London (GB); Omer Zach, New York, NY (US); Alexander Joseph McLeod, San Francisco, CA (US)

(73) Assignee: Stripe, LLC, South San Francisco, CA (US)

( * ) Notice: Subject to any disclaimer, the term of this patent is extended or adjusted under 35 U.S.C. 154(b) by 0 days.

(21) Appl. No.: 18/070,776

(22) Filed: Nov. 29, 2022

(65) Prior Publication Data

US 2024/0177159 A1     May 30, 2024

(51) Int. Cl.
    *G06Q 20/40*        (2012.01)
    *G06Q 20/10*        (2012.01)
(52) U.S. Cl.
    CPC ....... *G06Q 20/4015* (2020.05); *G06Q 20/102* (2013.01)
(58) Field of Classification Search
    CPC .......................... G06Q 20/4015; G06Q 20/102
    USPC .......................................................... 705/44
    See application file for complete search history.

(56) References Cited

U.S. PATENT DOCUMENTS

| | | | | | |
|---|---|---|---|---|---|
| 8,719,919 | B2 * | 5/2014 | Rice | ......................... | H04L 67/63 |
| | | | | | 726/4 |
| 2009/0180602 | A1 * | 7/2009 | Ramanathan | ..... | H04M 3/42374 |
| | | | | | 379/211.02 |
| 2013/0019018 | A1 * | 1/2013 | Rice | ......................... | H04L 67/51 |
| | | | | | 709/226 |
| 2017/0328725 | A1 * | 11/2017 | Schlesinger | ....... | G01C 21/3438 |
| 2020/0412635 | A1 * | 12/2020 | Jha | .......................... | H04W 4/40 |

OTHER PUBLICATIONS

Amin, R., Rojas, E., Aqdus, A., Ramzan, S., Casillas-Perez, D. and Arco, J.M., 2021. A survey on machine learning techniques for routing optimization in SDN. IEEE Access, 9, pp. 104582-104611. (Year: 2021).*

(Continued)

*Primary Examiner* — Elizabeth H Rosen
*Assistant Examiner* — John O Preston
(74) *Attorney, Agent, or Firm* — Foley & Lardner LLP

(57)                    ABSTRACT

In an example embodiment, a system is provided that allows for multiple service partners to be accessible simultaneously via a single API. The system ensures that requests to collect payment information are sent only to a service partner that is active and operating, ensuring that a request to collect payment information that would normally have been sent to a service partner that is down or otherwise unavailable will be rerouted to an alternative service partner. Furthermore, the system also allows for a dynamic selection of a service partner to utilize among multiple service providers, based on factors such as how well the service provider's system integrates with the underlying institution from which the payment will be made, and the estimated speed of the processing of the transaction by the service provider. This latter aspect can be technically challenging because the same institution may be known by multiple different names on the different service providers.

20 Claims, 10 Drawing Sheets

(56)  References Cited

OTHER PUBLICATIONS

Valadarsky, A., Schapira, M., Shahaf, D. and Tamar, A., Nov. 2017, Learning to route. In Proceedings of the 16th ACM workshop on hot topics in networks (pp. 185-191). (Year: 2017).*

Hussain, Q., Noor, A.S.M., Qureshi, M.M., Li, J., Rahman, A. U., Bakry, A., Mahmood, T. and Rehman, A., 2025. Reinforcement learning based route optimization model to enhance energy efficiency in internet of vehicles. Scientific Reports, 15(1), p. 3113. (Year: 2025).*

* cited by examiner

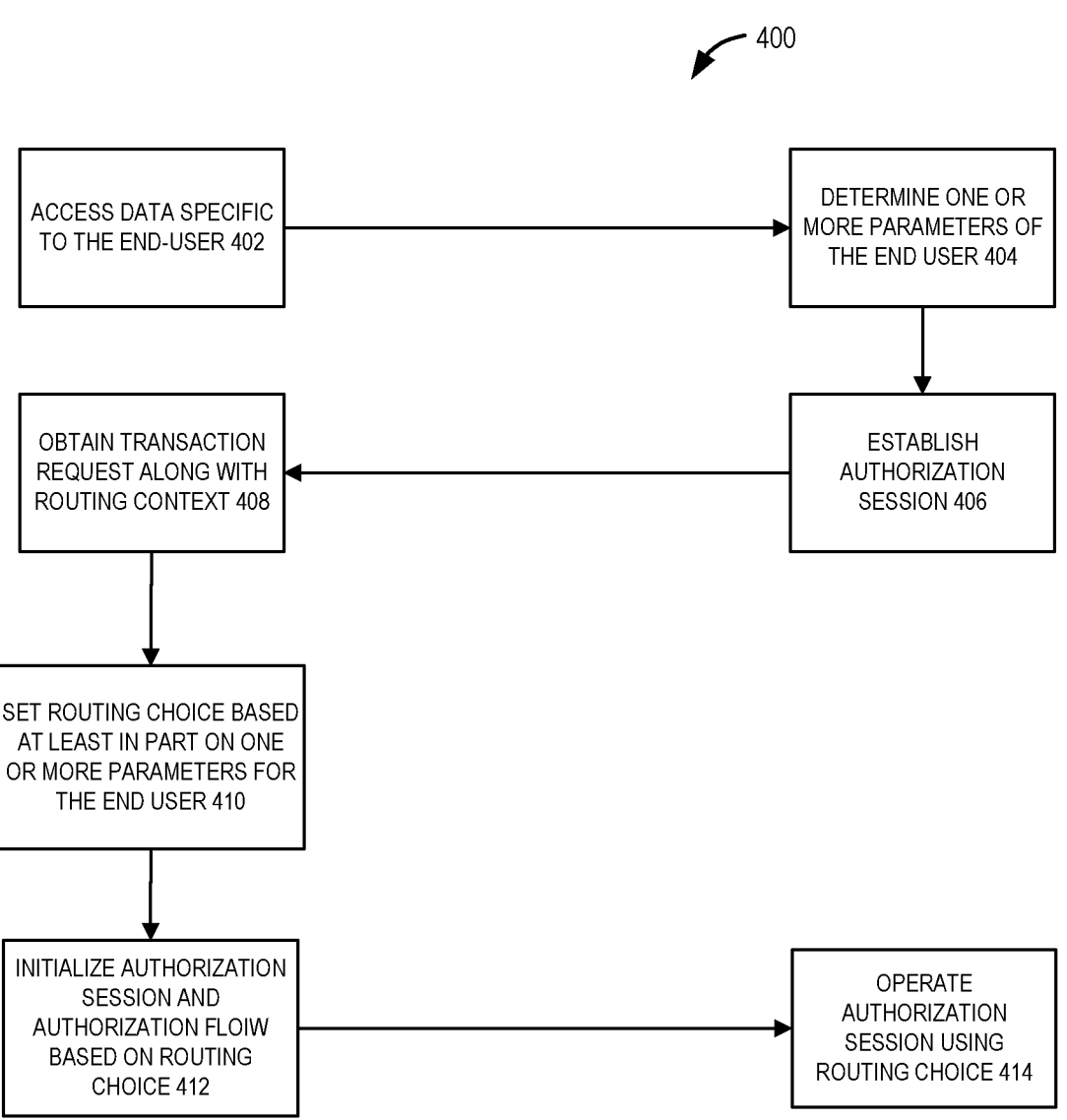

400

ACCESS DATA SPECIFIC TO THE END-USER 402

DETERMINE ONE OR MORE PARAMETERS OF THE END USER 404

ESTABLISH AUTHORIZATION SESSION 406

OBTAIN TRANSACTION REQUEST ALONG WITH ROUTING CONTEXT 408

SET ROUTING CHOICE BASED AT LEAST IN PART ON ONE OR MORE PARAMETERS FOR THE END USER 410

INITIALIZE AUTHORIZATION SESSION AND AUTHORIZATION FLOIW BASED ON ROUTING CHOICE 412

OPERATE AUTHORIZATION SESSION USING ROUTING CHOICE 414

*FIG. 4*

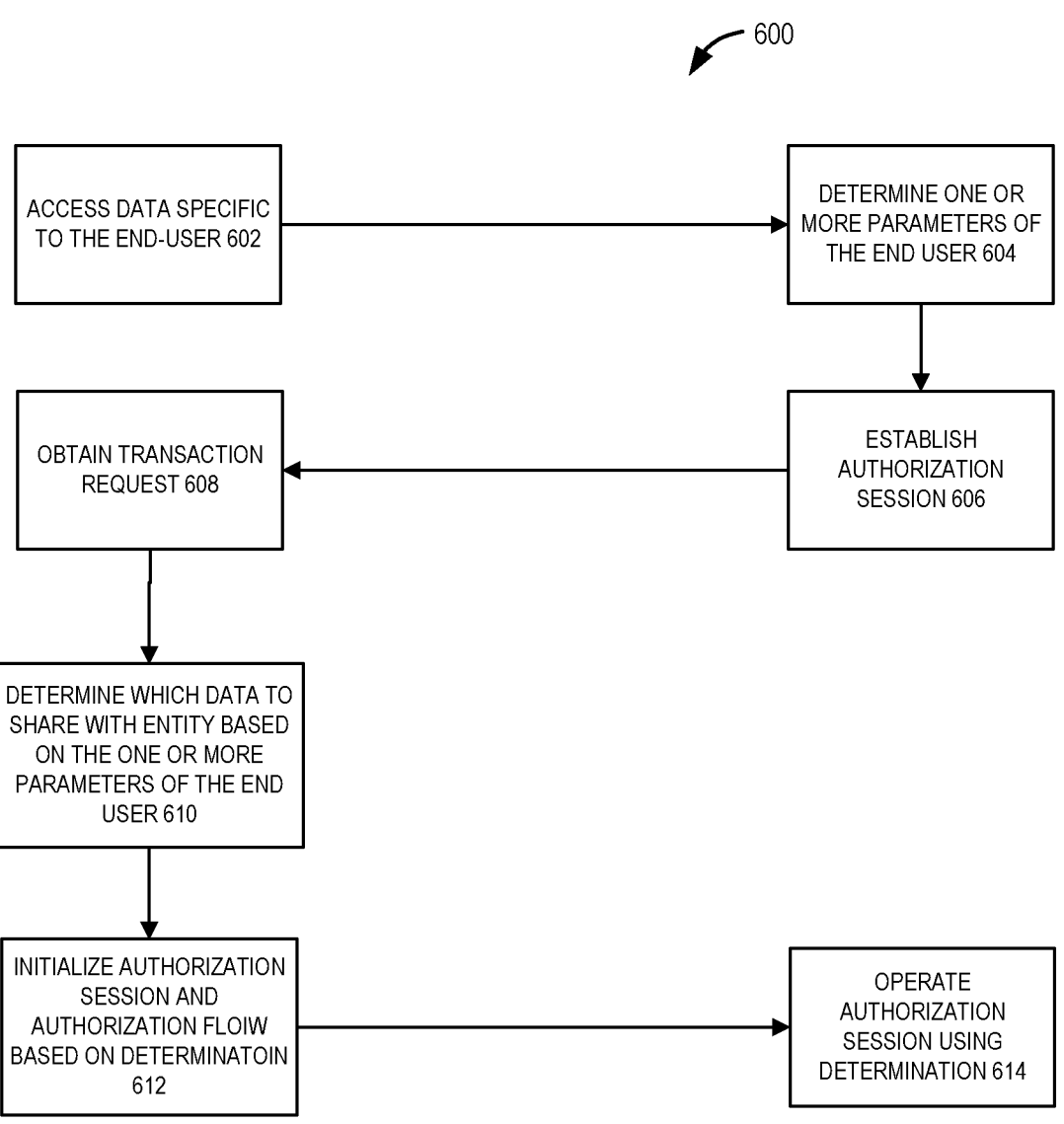

600

ACCESS DATA SPECIFIC TO THE END-USER 602

DETERMINE ONE OR MORE PARAMETERS OF THE END USER 604

ESTABLISH AUTHORIZATION SESSION 606

OBTAIN TRANSACTION REQUEST 608

DETERMINE WHICH DATA TO SHARE WITH ENTITY BASED ON THE ONE OR MORE PARAMETERS OF THE END USER 610

INITIALIZE AUTHORIZATION SESSION AND AUTHORIZATION FLOIW BASED ON DETERMINATOIN 612

OPERATE AUTHORIZATION SESSION USING DETERMINATION 614

*FIG. 6*

POWER

706

PROCESSING SYSTEM

810

INTERFACE COMPONENT

100

SERVICE PROVIDER ROUTING SYSTEM

710

NETWORK

CUSTOMIZABLE INTERMEDIARY PLATFORM FOR CONNECTING ENTITIES

BACKGROUND

A payment processor may provide a set of programmable application program interfaces (APIs) to merchants, that allows for the specific payment processing mechanisms provided by the payment processor to be integrated into a merchant's software platform or marketplace. This allows customers to build and scale end-to-end payment experiences, from instant onboarding to global payouts.

The payment processor may utilize a service provider, which is an entity that works with thousands of banks. However, there are multiple possible service providers, each of which has its own strengths and weaknesses, and each of which may work better or worse with particular banks. Additionally, occasionally a service provider may be unavailable due to network outage, maintenance, or the like, which can cause a downtime in collecting payment details.

BRIEF DESCRIPTION OF THE DRAWINGS

Some embodiments are illustrated by way of example and not limitation in the figures of the accompanying drawings.

FIG. 4 is a flow diagram illustrating a method of routing an electronic request, in accordance with another example embodiment.

FIG. 6 is a flow diagram illustrating a method 600, in accordance with an another embodiment.

DETAILED DESCRIPTION

Figure 1:
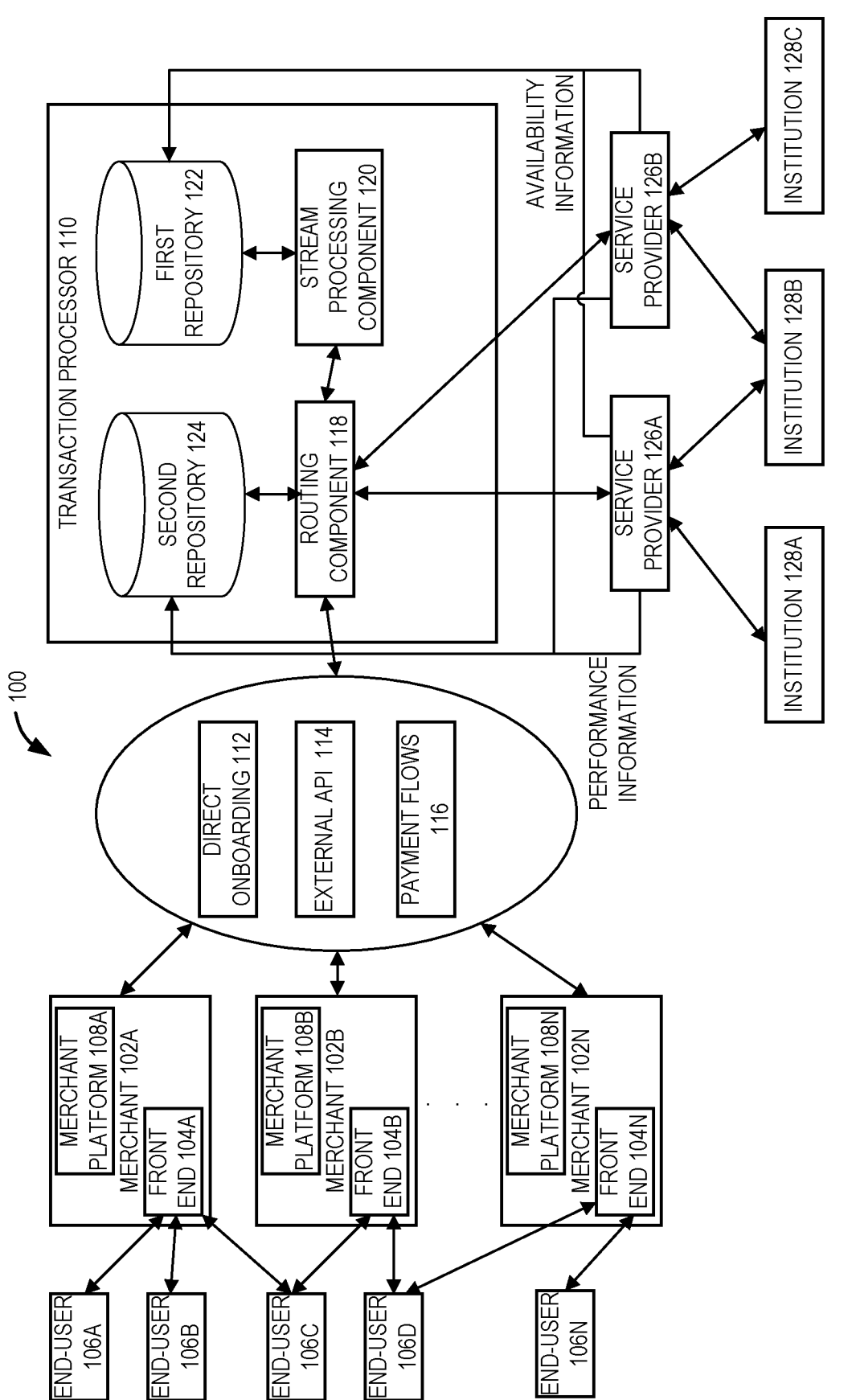
FIG. 1 is a block diagram illustrating a service provider routing system, in accordance with an example embodiment.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In an example embodiment, a system is provided that allows for multiple service partners to be accessible simultaneously via a single API. The system ensures that requests to collect payment information are sent only to a service partner that is active and operating, ensuring that a request to collect payment information that would normally have been sent to a service partner that is down or otherwise unavailable will be rerouted to an alternative service partner. Furthermore, the system allows for a dynamic selection of a service partner to utilize among multiple service providers, based on factors such as how well the service provider's system integrates with the underlying bank from which the payment will be made, and the estimated speed of the processing of the transaction by the service provider. This latter aspect can be technically challenging because the same bank may be known by multiple different names on the different service providers (e.g., "Trust Bank" on one service provider and just "Trust" on another service provider).

In an example embodiment, the system maintains preferences that identify a ranking of service providers for each (unique) bank, such that the system may first attempt to route a request to collect payment information for a bank to the highest ranked service provider in the preference profile for that bank, and then route the request to collect payment information to the second ranked service provider if the highest ranked service provider is down or otherwise unavailable. In some example embodiments, the preference profile may be expanded to provide a percentage for each service provider, the percentage indicating the likelihood that a request to collect payment information is sent to the corresponding service provider. For example, the preference profile for "Trust Bank" may indicate that service provider A is highest ranked and has a percentage of 80%, while service provider B is next highest ranked and has a percentage of 20%. This indicates that 80% of the time, a new request to collect payment information for Trust Bank should be routed to service provider A, and 20% of the time a new request to collect payment information for Trust Bank should be routed to service provider B. Providing this percentage allows for testing data to be collected. Specifically, a user setting the preference profile for Trust Bank may, based on various factors, determine that service provider A is likelier to be the better service provider and that service provider B is likelier to be worse, and thus that service provider B should only be used if service provider A is down or unavailable. However, routing a certain percentage of requests to collect payment information through service provider B anyway allows performance data about how service provider B performed with respect to Trust Bank, and comparing that performance data to performance data about how service provider A performed with respect to Trust Bank. The result is that the ranking for Trust Bank may be changed to place service provider B at the top of the ranking if, for example, performance data suggests that service provider B is performing better than service provider A with respect to Trust Bank transactions.

In an example embodiment, rather than manually tuning the preferences, an automated system is provided. Specifically, there are some technical issues that are encountered with the use of manually tuned preferences. First of all, the number of different signals that can be utilized in determining which service provider is a "better" service provider increases as the number of different types of transactions are processed. Additionally, which signals are important in a decision on where to route an electronic request can vary depending upon the situation. For example, two possible signals can include the rate of errors in transaction processing and the speed of transaction processing. In some instances, however, processing transactions quickly is more important than eliminating errors, while in some instances the opposite is true. Additionally, the patterns of performance in various signals can be complex. Sometimes, for example, a service provider may perform better during certain hours of the day than others, or on certain days of the week, etc.

Furthermore, the "best" service provider can vary from minute to minute based on a number of different factors. A bank, for example, may make a small change to its internal processing system that might affect one service provider more than another. Being able to detect such a shift and reroute transaction request traffic to the best service provider at the exact time of processing is important.

In an example embodiment, a data-driven and automated dynamic transaction payment routing system is provided. Input signals are received from a plurality of different heterogeneous sources, and during different time horizons. One of the sources may be an offline process that precomputes a series of metrics based on historical performance across different product and service areas and also segmented by bank-specific use cases. Some of the other sources are real-time sources of information about transaction processing. The system is then able to dynamically update the routing rules based on these sources. The routing decisions can then be made on-the-fly as new transaction requests are received.

In a further example embodiment, the system is also a framework for customization, where characteristics of merchants are learned (such as characteristics of a merchant's model and industry). Some merchants, for example, care more about authentication rate, while some are more sensitive to error rate.

Additionally, in an example embodiment, characteristics about end users (e.g., customers of the merchants) can also be learned and used in determining the routing decision in real-time. Some end users, for example, may have certain preferences for privacy and/or data protection, and indeed, some end users may be in jurisdictions which require different levels of privacy and data protection than other users. The system is able to determine these characteristics and adjust the routing decision based on them.

In such an example embodiment, the characteristics about end users may be extracted from user profiles, which may be partially or completely made available to the system. For example, a user may have a user profile with personal information as well as one or more preferences that were explicitly provided by the user, such as an explicit preference for data protection. The personal information itself may not be shared with the system, but the one or more preferences may be, so that the system can use that preference in making the routing decision. For example, a user requesting a high level of data protection may cause a transaction involving that user to be routed to Service Provider B rather than Service Provider A, due to Service Provider B's increased data and privacy protections over Service Provider A.

In other example embodiments, the one or more preferences may themselves be learned based on a machine learning model. For example, the machine learned model may be trained by a machine learning algorithm to determine preferences based on input data about the user and/or usage patterns of the user. For example, such a machine learning algorithm may be able to deduce that the user has a preference for privacy protection due to a transaction history of the user and the types of services purchased in those transaction histories, or the locations of the merchants involved in the transaction histories. Alternatively, an aspect of the user's own profile may be used to deduce one or more preferences, such as the user's location.

It should be noted that these preferences, whether express or implied, may, in some example embodiments, be weighted in accordance with an express or implied importance of each of the preferences. For example, a user may expressly indicate that there is a preference to not have service providers cache their private information. In such a case, even if, for example, service provider A has better performance and returns better quality data compared to service provider B, routing may be set to service provider B for this end user because service provider A does cache end user data on their side.

In another example, service provider A provides authorization via OAuth and service provider B requires users to share their login credentials (e.g., passwords) directly. In such a case, service provider A may be prioritized because an auth flow offers better security and, in the event of service providers being compromised, the user's sensitive data will still be protected.

In some instances, the level of data protection or privacy preferred by a user need not be a binary decision (e.g., wants protection/privacy or does not). In these cases, an importance level may be provided, such as the importance of the concern being "medium" as opposed to "low" or "high." In such an instance, the ability of the service providers to provide data protection may or may not wind up being a determining factor in whether a particular service provider is selected for a particular transaction. For example, while Service Provider B may provide better data and privacy protections than Service Provider A, Service Provider A may be more capable of processing the transaction quickly, and thus may be selected as the service provider, as opposed to a scenario where the user has indicated that the importance of data protection for them is "high", where Service Provider B may be selected despite its slower processing time.

This importance level can also be learned via the same machine learning model as can be used to learn the preferences in the first place. For example, the machine learning model can be trained to infer that not only that the user has a preference for data protection, but that the importance of data protection to that user is "high."

Regardless, the user remains in full control of their data sharing/protection/privacy settings, and the user's choices are given first priority over any other routing considerations. Furthermore, the user is explicitly and clearly informed of the type of data they share and who they are sharing it with.

Users can be further protected by choosing the service provider that requires the least amount of privileges that satisfies the merchant's stated data access goals, which may compromise on performance and data quality goals but ultimately protects the end users.

It should also be noted that in some example embodiments, the term "merchant" shall be interpreted broadly to cover other entities involved in the transaction other than the service provider and the end merchant (e.g., the store the user is purchasing from). Such entities may include, for example, mobile payment services.

The user preferences described above can, in addition to being used in the process of selecting a service provider, also be used in determining what information is or is not shared with the service providers or other entities. Thus, for example, if a user has expressed a preference for data protection, then some private data, such as certain fields of a user profile or certain details of the transaction, will not be shared with the selected service provider, whereas if the user has not expressed such a preference for data protection, that same private data would be shared with the selected service provider.

FIG. 1 is a block diagram illustrating a service provider routing system 100, in accordance with an example embodiment. The service provider routing system 100 includes a plurality of merchants 102A-102N. Each merchant 102A-102N may provide a front-end 104A-104N, which causes a display to one or more end users 106A-106N. For example, the front-end 104A-104N may be a website or an application, which is executed by a device operated by an end user 106A-106N to perform some sort of transaction.

Each merchant 102A-102N may have its own merchant platform 108A-108N, which performs the operation of their respective interface processes, including, for example, surfacing products or services in the front-end and providing the various interfaces for the end users 106A-106N to initiate an electronic request. Upon initiation of an electronic request, the merchant 102A-102N may then communicate with a transaction processor 110. The merchant 102A-102N may communicate with the transaction processor 110 via direct onboarding 112, an external API 114, and/or payment flows 116. The direct onboarding 112, external API 114, and payment flows 116 are specific use cases. They represent different kinds of integrations merchants can use connections for. This communication may include the transaction request itself, as well as a routing context. A routing context includes any information about the transaction, merchant, or end-user that may be relevant in dynamically determining the routing of the transaction request, such as merchant preferences, merchant information (such as location, industry, model, etc.), and end user information.

The communication may be received by a routing component 118 on the transaction processor 110. A stream processing component 120 may monitor reliability of financial institutions and store information about institution availability in a first repository 122. The stream processing component 120 may also send real-time signals to the routing component 118.

The routing component 118 may make decisions on where to route transaction requests based on various real-time signals from the stream processing component 120, the transaction request itself, the routing context, and institution availability (such as feature-by-feature availability) information from the first repository. It may also base this information on raw event or analytics information obtained from a second repository 124. This raw event or analytics information may be obtained by a batch job, which may include modeling and inference steps. The routing decision made by the routing component 118 selects one of a plurality of service providers 126A, 126B. Once the routing decision is made, the transaction request is routed to the selected service provider 126A, 126B by creating an authorization session, which may make partner-layer API calls to an available partner service provider 126A, 126B. The service provider 126A, 126B may then pass the transaction request to the appropriate institution (bank) 128A, 128B, 128C, via direct integration.

Events, webhooks, or errors that are encountered during the processing of the transaction request from the appropriate service provider 126A, 126B and institution 128A, 128B, 128C are logged in the second repository 124.

It should be noted that while FIG. 1 depicts two service providers 126A, 126B, there may be any number of service providers from which the routing component 118 selects to route the transaction request. Additionally, while in FIG. 1, institution 128B is depicted as being connected to both service providers 126A, 126B, whereas institutions 128A and 128C are depicted as only being connected to a single service provider, in implementation any institution may be connected to any number of different service providers. The routing component 118 may, at a threshold level, first determine which service provider 126A, 126B is connected to an institution at which a particular transaction should be completed. If there is only one service provider connected to such an institution, then the routing component 118 has only one choice as to where to route the transaction request. As such, the concepts described herein mostly apply to situations where there are at least two different service providers connected to the institution at which the transaction should be completed, such that a choice between the service providers is necessary. Nevertheless, the functionality of how such a routing decision is made is present even if it is not utilized in "simple" cases where there is only one available service provider for an institution at which the transaction should be completed.

Figure 2:
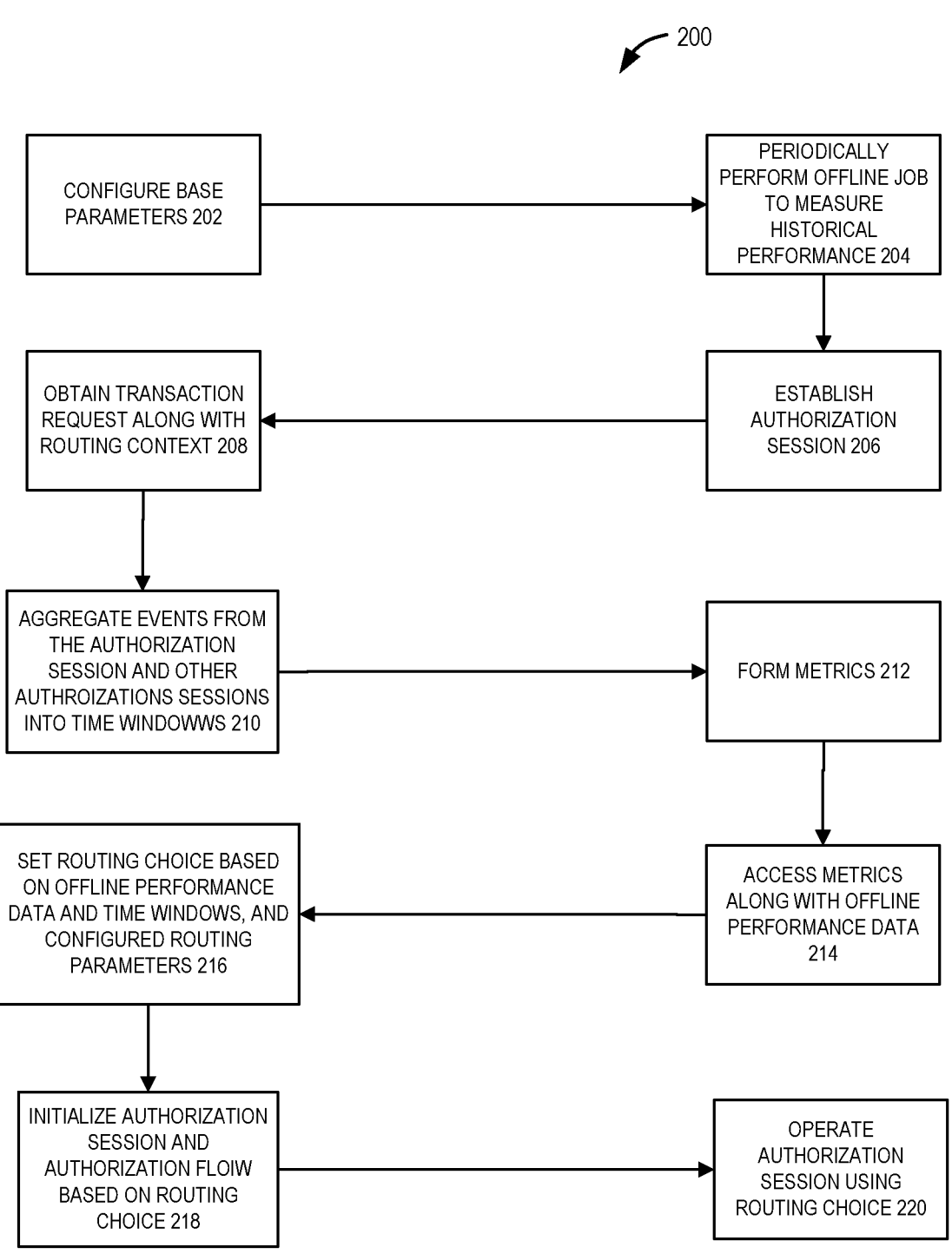
FIG. 2 is a flow diagram illustrating a method of routing an electronic request, in accordance with an example embodiment.

FIG. 2 is a flow diagram illustrating a method 200 of routing an electronic request, in accordance with an example embodiment. At operation 202, base routing parameters may be configured. These base routing parameters may be configured using default settings, or may be manually set by a user, such as an administrator at a merchant. At operation 204, an offline job is periodically performed to measure historical performance by a plurality of service providers. Metrics measured during this operation may include, for example, processing speed and error rate.

At operation 206, an authorization session is established. An authorization session may actually include more than one transaction request, as a user can request multiple transaction requests (or other requests) within the same session. At operation 208, an electronic request along with a routing context are obtained. In an example embodiment, the routing context can include information such as partner institution (an unordered list of institutions supporting the transaction request, each institution having at least one service provider attached to it), product, country, list of required features (as well as a Boolean indicating whether OAuth support is required), and platform (identifier/namespace uniquely associated with each merchant user).

At operation 210, events from the authorization session (and other authorization sessions from other users) are aggregated into time windows, such as fifteen minute windows. More particularly, each authorization session may generate various events at various times. These events may include transaction request initiations as well as the results of these transaction requests (e.g., success or failure) These different events may be grouped by time window of when they occurred. At operation 212, metrics are then formed based on the data in the time windows. An example of such a metric may be success rate over time windows. Thus, for example, the metric may indicate that service provider A might have had a 80% success rate with Bank A transactions from 3:00-3:15, and only a 50% success rate with Bank A transactions from 3:15-3:30. The same metric may indicate that service provider B might have had a 60% success rate with Bank A transactions from 3:00-3:15 and a 62% success rate with Bank A transactions from 3:15-3:30. This will come in handy for future routing decisions, which may decide that an electronic request for Bank A at 3:10 will be routed to service provider A but if that same transaction request is received at 3:20 it will be routed to service provider B. Another example metric is data retrieval rate. The metrics along with the offline performance data are then accessed by a routing component at operation 214. The size of the institution (e.g., large institution vs. small institution) can also be taken into account at this stage and the aggregated time windows and/or events may be tagged with the size of the institution, for future use in operation 216 as part of the routing choice.

At operation 216, a routing choice of a particular session provider is set based on the offline performance data and time windows, as well as the configured routing parameters. This routing choice may be set based on one or more routing rules. It should be noted that the performance data and time windows may not be the only factors. Other factors, such as entity preferences, end-user preferences, the institution that the transaction involves (and which service providers connect to that institution), and historical information about which service providers were used in the past could also be factors. The decision of which factors to utilize, and the importance(s) to place on each, can be embodied in one or more routing choice rules.

For example, a first routing choice rule may specify that performance data is the most important factor, with historical information about which service providers were used in the past as a less important factor. It may not specify end-user preferences as a factor at all. In such a case, performance data, as measured using the time windows, is weighted heavily by the first routing choice rule while historical information about which service providers were used in the past is weighted slightly by the first routing choice rule, and the first routing choice rule may select a service provider based on this data and weightings (e.g., by using a weighted sum operation).

In another example, a second routing choice rule may specify that end-user preferences are the most important factor, with performance data being of medium importance, and historical information about which service providers were used in the past as having low importance. In such a case, the end-user preferences are weighted heavily by the first routing choice rule, performance data, as measured in the time windows, is weighted at a medium level, while historical information about which service providers were used in the past is weighted slightly by the first routing choice rule, and the first routing choice rule may select a service provider based on this data and weightings (e.g., by using a weighted sum operation).

At operation 218, an authorization session and authorization flow are initialized based on the routing choice. At operation 220, the authorization session is operated using the routing choice.

Figure 3:
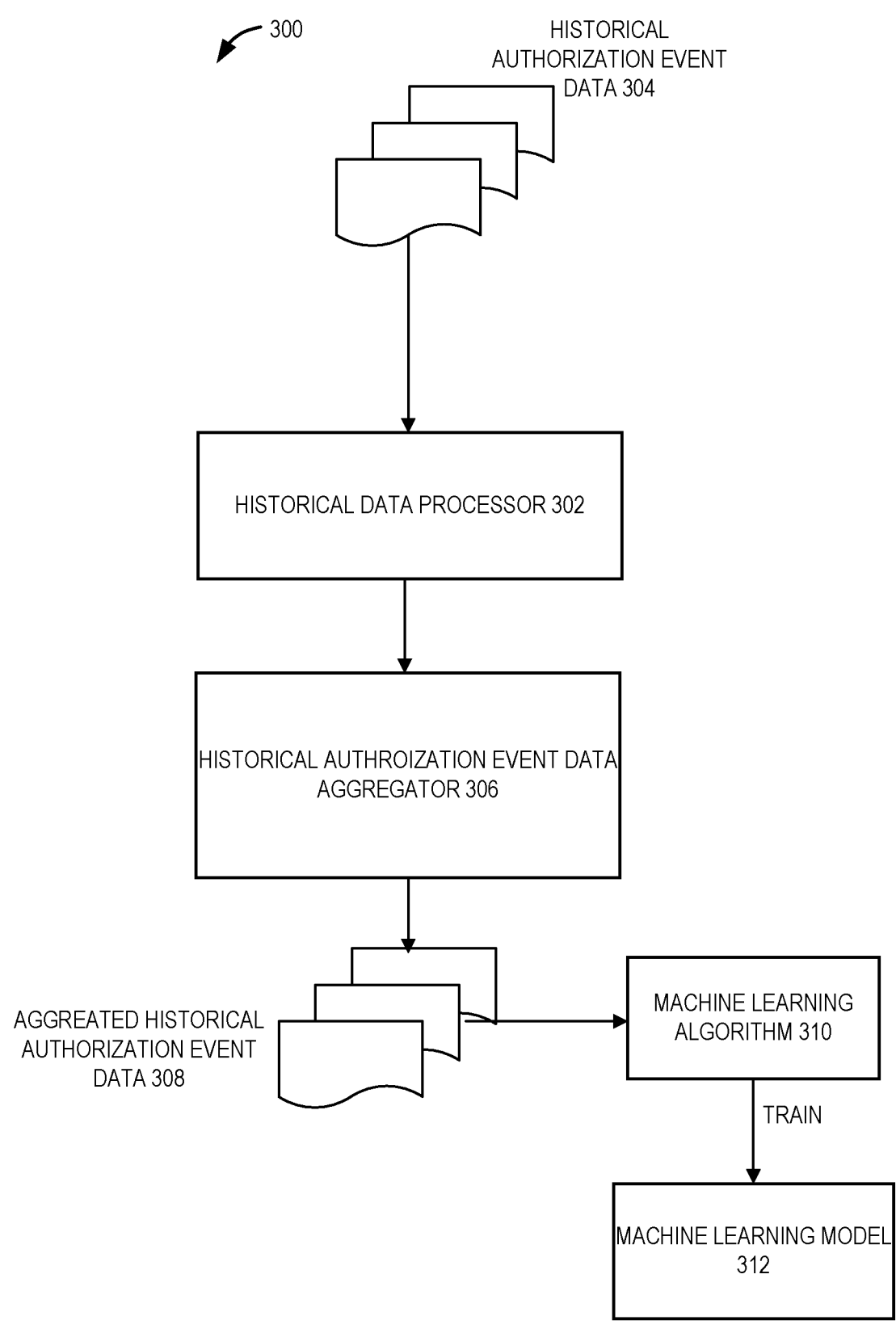
FIG. 3 is a block diagram illustrating a machine learning model training system, in accordance with an example embodiment.

In an example embodiment, machine learning techniques may be utilized to aid in the routing decision process. FIG. 3 is a block diagram illustrating a machine learning model training system 300, in accordance with an example embodiment. Here, a historical data processor 302 may access and process historical authorization event data 304. This historical authorization event data 304 may include any events generated during past authorizations, including transaction requests, the outcomes of those events, and the times/dates the events occurred.

A historical authorization event data aggregator 306 may group the historical authorization event data 304 by time window. In some example embodiments, further transformation of the historical authorization event data 304 may occur, such as by reformatting the historical authorization event data 304, normalizing values in the historical authorization event data 304, and/or extracting features and computing metrics from those features. In some example embodiments, the raw events are anonymized at this stage as well.

The aggregated historical authorization event data 308 may then be passed to a machine learning algorithm 310, which may train a machine learning model 312 to determine a routing decision for an input transaction request. The machine learning algorithm 310 may iterate among various parameters, changing parameters (weights) multiplied by various input variables and evaluating a loss function at each iteration, until the loss function is minimized, at which stage the parameters for that stage are learned. Labels for the input aggregated historical authorization event data 308 may take the form of the outcomes of the corresponding authorizations (e.g., success or failure). Specifically, the weights are multiplied by the input variables as part of a weighted sum operation, and the weighted sum operation is used by the loss function.

The machine learning algorithm 310 may also be selected from among many other different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

FIG. 4 is a flow diagram illustrating a method 400, in accordance with another embodiment. This method 400 involves determining one or more parameters of an end-user, and utilizing these one or more parameters in a routing choice for a transaction involving the end-user. At operation 402, data specific to the end user is accessed. This data may be selected from a number of different types of data that are specific to the end user, such as a user profile corresponding to the end user (which may be stored by an entity that will be involved in the transaction, such as a mobile payment provider), or past transaction data involving the end user. At operation 404, one or more parameters of the end user are determined. In some example embodiments, the one or more parameters are determined by looking for explicitly defined parameters in the data, such as a user selection of a parameter (e.g., data privacy) of importance to the end user, while in other example embodiments the one or more parameters are inferred from a machine learning model trained to infer parameters of importance to an end user from other information known about the end user (such as other fields of the user profile, or past transaction information). In some example embodiments, there may be a combination of explicitly-provided parameters and inferred parameters.

In some example embodiments, in addition to the one or more parameters being determined, an importance level of each of the corresponding one or more parameters may also be determined. Like with the parameters themselves, this importance level can also either be explicitly provided by the end user, or inferred using a machine learning model.

At operation 406, an authorization session is established. An authorization session may actually include more than one transaction request, as a user can request multiple transaction requests (or other requests) within the same session. At operation 408, an electronic request along with a routing context are obtained. In an example embodiment, the routing context can include information such as core institution (an unordered list of institutions supporting the transaction request, each institution having at least one service provider attached to it), product, country, list of required features (as well as a Boolean indicating whether OAuth support is required), and platform.

At operation 410, a routing choice of a particular session provider is set based on at least the one or more parameters of the end user. This routing choice may be set based on one or more routing rules.

At operation 412, an authorization session and authorization flow are initialized based on the routing choice. At operation 414, the authorization session is operated using the routing choice.

Figure 5:
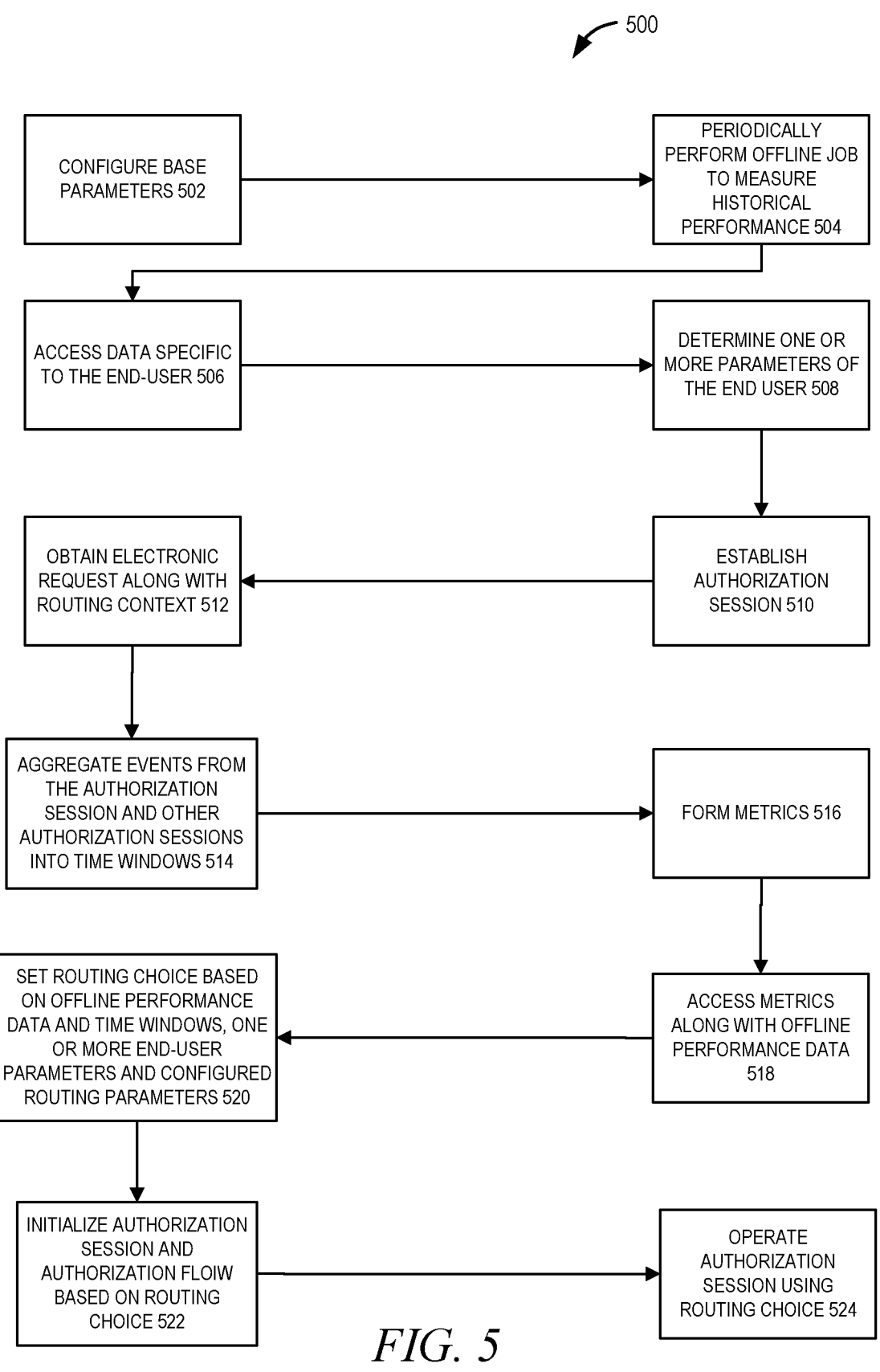
FIG. 5 is a flow diagram illustrating a method of routing an electronic request, in accordance with another example embodiment.

FIG. 5 is a flow diagram illustrating a method 500, in accordance with another example embodiment. Here, the methods 200 and 400 of FIGS. 2 and 4, respectively, are combined into a single embodiment. At operation 502, base routing parameters may be configured. These base routing parameters may be configured using default settings, or may be manually set by a user, such as an administrator at a merchant. At operation 504, an offline job is periodically performed to measure historical performance by a plurality of service providers. Metrics measured during this operation may include, for example, processing speed and error rate.

At operation 506, data specific to the end user is accessed. At operation 508, one or more parameters of the user are determined from the data. At operation 510, an authorization session is established. An authorization session may actually include more than one transaction request, as a user can request multiple transaction requests (or other requests) within the same session. At operation 512, an electronic request along with a routing context are obtained. In an example embodiment, the routing context can include information such as core institution (an unordered list of institutions supporting the transaction request, each institution having at least one service provider attached to it), product, country, list of required features (as well as a Boolean indicating whether OAuth support is required), and platform.

At operation 514, events from the authorization session (and other authorization sessions from other users) are aggregated into time windows, such as fifteen minute windows. More particularly, each authorization session may generate various events at various times. These events may include transaction request initiations as well as the results of these transaction requests (e.g., success or failure) These different events may be grouped by time window of when they occurred. At operation 516, metrics are then formed based on the data in the time windows. The metrics along with the offline performance data and the one or more end-user preferences are then accessed by a routing component at operation 518.

At operation 520, a routing choice of a particular session provider is set based on the offline performance data, time windows, and one or more end-user parameters, as well as the configured routing parameters. This routing choice may be set based on one or more routing rules.

At operation 522, an authorization session and authorization flow are initialized based on the routing choice. At operation 524, the authorization session is operated using the routing choice.

FIG. 6 is a flow diagram illustrating a method 600, in accordance with another embodiment. This method 600 involves determining one or more parameters of an end-user, and utilizing these one or more parameters in determining what data to share with an entity, such as a mobile payment processor. Optionally these one or more parameters are also used to determine the flow of data as well. At operation 602, data specific to the end user is accessed. This data may be selected from a number of different types of data that are specific to the end user, such as a user profile corresponding to the end user (which may be stored by an entity that will be involved in the transaction, such as a mobile payment provider), or past transaction data involving the end user. At operation 604, one or more parameters of the end user are determined. In some example embodiments, the one or more parameters are determined by looking for explicitly defined parameters in the data, such as a user selection of a parameter (e.g., data privacy) of importance to the end user, while in other example embodiments the one or more parameters are inferred from a machine learning model trained to infer parameters of importance to an end user from other information known about the end user (such as other fields of the user profile, or past transaction information). In some example embodiments, there may be a combination of explicitly-provided parameters and inferred parameters.

In some example embodiments, in addition to the one or more parameters being determined, an importance level of each of the corresponding one or more parameters may also be determined. Like with the parameters themselves, this importance level can also either be explicitly provided by the end user, or inferred using a machine learning model.

At operation 606, an authorization session is established. An authorization session may actually include more than one transaction request, as a user can request multiple transaction requests (or other requests) within the same session. At operation 608, an electronic request is obtained.

At operation 610, it is determined which data to share with an entity, such as a mobile payment processor, based on the one or more parameters of the end user. For example, if the one or more parameters indicate that the user does not wish to share a specific piece of personal information or certain financial data with third parties, then such personal information or financial data may be removed, obscured or anonymized so that the specific piece of personal information or financial data is not visible or accessible by the entity within the provided UI.

At operation 612, an authorization session and authorization flow are initialized based on the determination. At operation 614, the authorization session is operated using the determination (i.e., data determined to be shared is shared, while data determined not to be shared is not shared).

Figure 7:
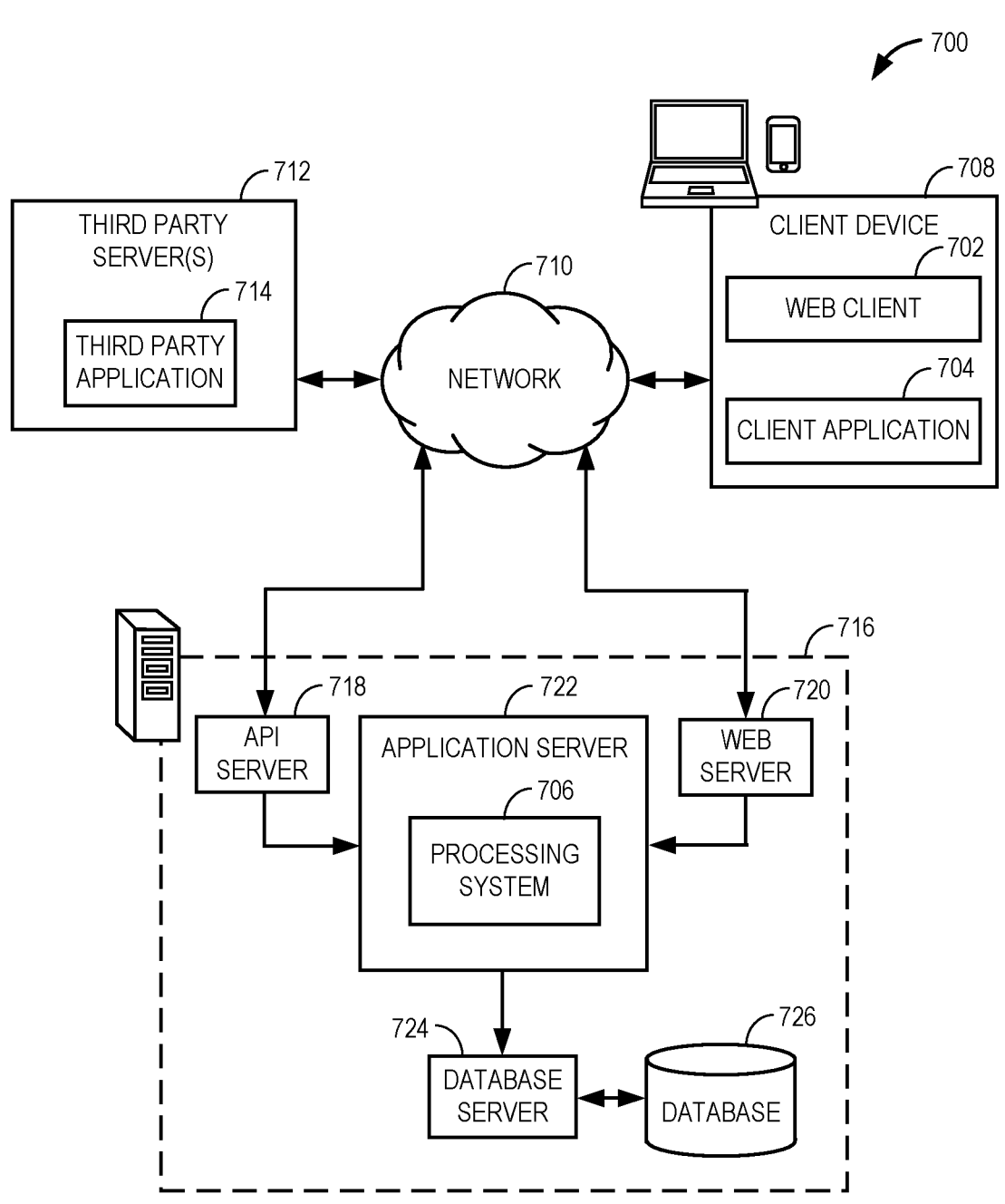
FIG. 7 is a block diagram illustrating a high-level network architecture, according to some example embodiments.

With reference to FIG. 7, an example embodiment of a high-level SaaS network architecture 700 is shown. A networked system 716 provides server-side functionality via a network 710 (e.g., the Internet or a WAN) to a client device 708. A web client 702 and a programmatic client, in the example form of a client application 704, are hosted and execute on the client device 708. The networked system 716 includes an application server 722, which in turn hosts a processing system 706 (such as the processing system hosted at https://stripe.com by Stripe, Inc. of San Francisco, CA (herein "Stripe") as an example of a payment processor) that provides a number of functions and services to the client application 704 that accesses the networked system 716. The client application 704 also provides a number of interfaces described herein, which can present an output in accordance with the methods described herein to a user of the client device 708.

The client device 708 enables a user to access and interact with the networked system 716 and, ultimately, the processing system 706. For instance, the user provides input (e.g., touch screen input or alphanumeric input) to the client device 708, and the input is communicated to the networked system 716 via the network 710. In this instance, the networked system 716, in response to receiving the input from the user, communicates information back to the client device 708 via the network 710 to be presented to the user.

An API server 718 and a web server 720 are coupled, and provide programmatic and web interfaces respectively, to the application server 722. The application server 722 hosts the processing system 706, which includes components or applications described further below. The application server 722 is, in turn, shown to be coupled to a database server 724 that facilitates access to information storage repositories (e.g., a database 726). In an example embodiment, the database 726 includes storage devices that store information accessed and generated by the processing system 706.

Additionally, a third-party application 714, executing on one or more third-party servers 712, is shown as having programmatic access to the networked system 716 via the programmatic interface provided by the API server 718. For example, the third-party application 714, using information retrieved from the networked system 716, may support one or more features or functions on a website hosted by a third party.

Turning now specifically to the applications hosted by the client device 708, the web client 702 may access the various systems (e.g., the processing system 706) via the web interface supported by the web server 720. Similarly, the client application 704 (e.g., an "app" such as a payment processor app) accesses the various services and functions provided by the processing system 706 via the programmatic interface provided by the API server 718. The client application 704 may be, for example, an "app" executing on the client device 708, such as an iOS or Android OS application to enable a user to access and input data on the networked system 716 in an offline manner and to perform batch-mode communications between the client application 704 and the networked system 716.

Further, while the SaaS network architecture 700 shown in FIG. 7 employs a client-server architecture, the present inventive subject matter is of course not limited to such an architecture, and could equally well find application in a distributed, or peer-to-peer, architecture system, for example. The processing system 706 could also be implemented as a standalone software program, which does not necessarily have networking capabilities.

Figure 8:
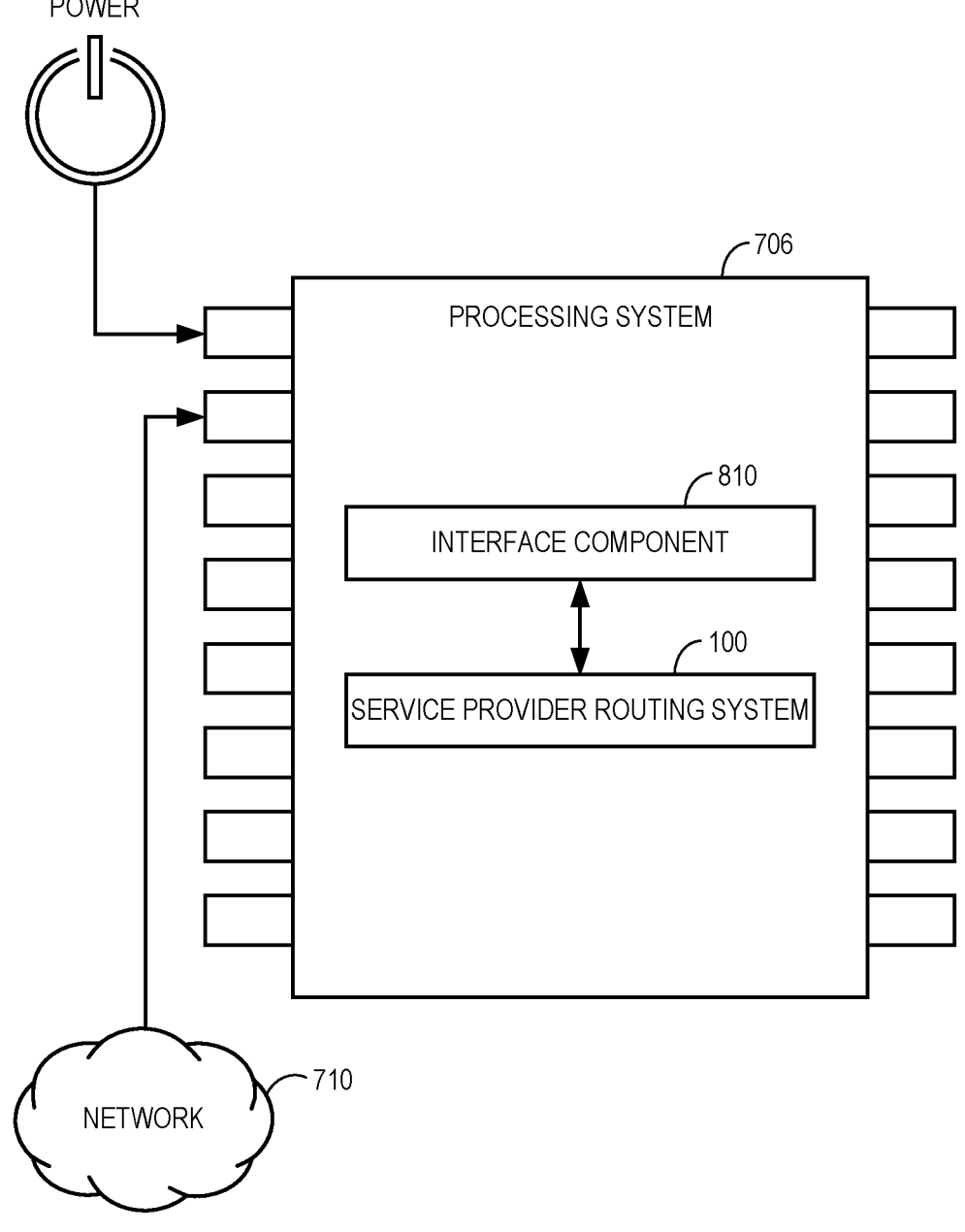
FIG. 8 is a block diagram showing architectural aspects of a publication system, according to some example embodiments.

FIG. 8 is a block diagram showing architectural details of a processing system 706 of FIG. 7, according to some example embodiments. Specifically, the processing system 706 is shown to include an interface component 810 by which the processing system 706 communicates (e.g., over a network 710) with other systems within the SaaS network architecture 700.

The interface component 810 is communicatively coupled to the service provider routing system 100 of FIG. 1 that operates to route transaction requests as described herein.

Described implementations of the subject matter can include one or more features, alone or in combination as illustrated below by way of example.

Example 1. A method comprising:
  receiving, from a first entity, an electronic request, wherein the electronic request corresponds to request for information stored by a first institution;
  identifying a routing context associated with the electronic request;
  determining a plurality of different service providers that have an association with the first institution;
  identifying transactional events performed in response to a plurality of electronic requests processed by the plurality of different service providers;
  aggregating the events into a plurality of time windows;

calculating a performance metric for each service provider in each of the plurality of time windows; and
  routing the electronic request to a first service provider of the plurality of service providers based on a current time, the routing context, and based on the calculated performance metrics.

Example 2. The method of Example 1, wherein the routing context includes one or more preferences corresponding to the first entity.

Example 3. The method of Examples 1 or 2, wherein the routing context includes a transaction location.

Example 4. The method of any of Examples 1-3, wherein the calculating the performance metric for each service provider includes determining an entity category corresponding to the first entity.

Example 5. The method of any of Examples 1-4, wherein the routing is further based on preferences set by an entity sending the authorization request, the entity having received the authorization request from an end user.

Example 6. The method of any of Examples 1-5, further comprising:
  determining one or more preferences corresponding to an end user of the first entity; and
  in response to receiving the information requested by the electronic request from the first service provider, abstracting a first portion of the information and providing the information including the abstracted first portion to the first entity.

Example 7. The method of Example 6, further comprising training a machine learning model to be used in the routing process by:
  obtaining historical electronic request processing information;
  transforming the historical electronic request processing information into training data by modifying one or more fields of data in the historical electronic request processing information;
  using a machine learning algorithm to train the machine learning model using the training data, the training including:
    setting values for a plurality of weights to be applied to fields of the training data;
    applying the plurality of weights with set values to corresponding values of fields in the training data;
    measuring results of the applying against a loss function; and
    altering the values for the plurality of weights based on the measuring.

Example 8. A system comprising:
  one or more processors;
  a non-transitory computer-readable medium storing instructions that, when executed by at least one processor among the one or more processors, cause the at least one processor to perform operations comprising:
    receiving, from a first entity, an electronic request, wherein the electronic request corresponds to request for information stored by a first institution;
    identifying a routing context associated with the electronic request;
    determining a plurality of different service providers that have an association with the first institution;
    identifying transactional events performed in response to a plurality of electronic requests processed by the plurality of different service providers;
    aggregating the events into a plurality of time windows;
    calculating a performance metric for each service provider in each of the plurality of time windows; and

routing the electronic request to a first service provider of the plurality of service providers based on a current time, the routing context, and based on the calculated performance metrics.

Example 9. The system of Example 8, wherein the routing context includes one or more preferences corresponding to the first entity.

Example 10. The system of Examples 8 or 9, wherein the routing context includes a transaction location.

Example 11. The system of any of Examples 8-10, wherein the calculating the performance metric for each service provider includes determining an entity category corresponding to the first entity.

Example 12. The system of any of Examples 8-11, wherein the routing is further based on preferences set by an entity sending the authorization request, the entity having received the authorization request from an end user.

Example 13. The system of any of Examples 8-12, wherein the operations further comprise:

determining one or more preferences corresponding to an end user of the first entity; and in response to receiving the information requested by the electronic request from the first service provider, abstracting a first portion of the information and providing the information including the abstracted first portion to the first entity.

Example 14. The system of Example 13, further comprising training a machine learning model to be used in the routing process by:

obtaining historical electronic request processing information;

transforming the historical electronic request processing information into training data by modifying one or more fields of data in the historical electronic request processing information;

using a machine learning algorithm to train the machine learning model using the training data, the training including:

setting values for a plurality of weights to be applied to fields of the training data;

applying the plurality of weights with set values to corresponding values of fields in the training data;

measuring results of the applying against a loss function; and altering the values for the plurality of weights based on the measuring.

Example 15. A non-transitory machine-readable medium comprising instructions which, when read by a machine, cause the machine to perform operations comprising:

receiving, from a first entity, an electronic request, wherein the electronic request corresponds to request for information stored by a first institution;

identifying a routing context associated with the electronic request;

determining a plurality of different service providers that have an association with the first institution;

identifying transactional events performed in response to a plurality of electronic requests processed by the plurality of different service providers;

aggregating the events into a plurality of time windows;

calculating a performance metric for each service provider in each of the plurality of time windows; and routing the electronic request to a first service provider of the plurality of service providers based on a current time, the routing context, and based on the calculated performance metrics.

Example 16. The non-transitory machine-readable medium of Example 15, wherein the routing context includes one or more preferences corresponding to the first entity.

Example 17. The non-transitory machine-readable medium of any of Examples 15-16, wherein the routing context includes a transaction location.

Example 18. The non-transitory machine-readable medium of any of Examples 15-17, wherein the calculating the performance metric for each service provider includes determining an entity category corresponding to the first entity.

Example 19. The non-transitory machine-readable medium of any of Examples 15-18, wherein the routing is further based on preferences set by an entity sending the authorization request, the entity having received the authorization request from an end user.

Example 20. The non-transitory machine-readable medium of any of Examples 15-19, wherein the operations further comprise:

determining one or more preferences corresponding to an end user of the first entity; and in response to receiving the information requested by the electronic request from the first service provider, abstracting a first portion of the information and providing the information including the abstracted first portion to the first entity.

Figure 9:
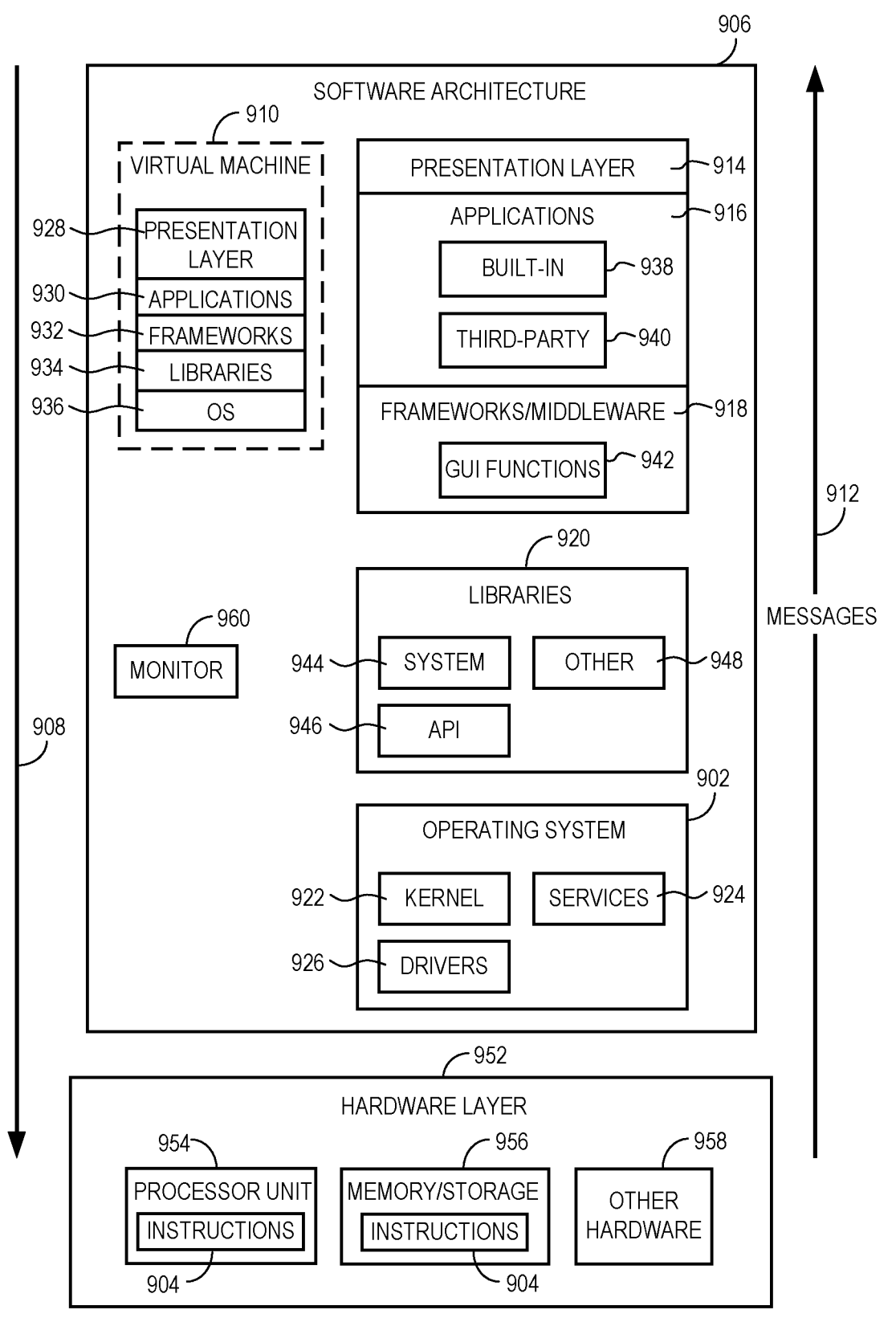
FIG. 9 is a block diagram illustrating an example software architecture, which may be used in conjunction with various hardware architectures herein described.

FIG. 9 is a block diagram illustrating an example software architecture 906, which may be used in conjunction with various hardware architectures herein described. FIG. 9 is a non-limiting example of a software architecture 906, and it will be appreciated that many other architectures may be implemented to facilitate the functionality described herein. The software architecture 906 may execute on hardware such as a machine 1000 of FIG. 10 that includes, among other things, processors 1004, memory/storage 1006, and input/output (I/O) components 1018. A representative hardware layer 952 is illustrated and can represent, for example, the machine 1000 of FIG. 10. The representative hardware layer 952 includes a processor 954 having associated executable instructions 904. The executable instructions 904 represent the executable instructions of the software architecture 906, including implementation of the methods, components, and so forth described herein. The hardware layer 952 also includes memory and/or storage modules as memory/storage 956, which also have the executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive a response as messages 912 in response to the API calls 908. The layers illustrated are representative in nature, and not all software architectures have all layers. For example, some mobile or special-purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than by interfacing directly with the underlying operating system 902 functionality (e.g., kernel 922, services 924, and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 9D graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 provide a higher-level common infrastructure that may be used by the applications 916 and/or other software components/modules. For example, the frameworks/middleware 918 may provide various graphic user interface (GUI) functions 942, high-level resource management, high-level location services, and so forth. The frameworks/middleware 918 may provide a broad spectrum of other APIs that may be utilized by the applications 916 and/or other software components/modules, some of which may be specific to a particular operating system or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. The third-party applications 940 may include any application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 940 may invoke the API calls 908 provided by the mobile operating system (such as the operating system 902) to facilitate functionality described herein.

The applications 916 may use built-in operating system functions (e.g., kernel 922, services 924, and/or drivers 926), libraries 920, and frameworks/middleware 918 to create user interfaces to interact with users of the system. Alternatively, or additionally, in some systems, interactions with a user may occur through a presentation layer, such as the presentation layer 914. In these systems, the application/component "logic" can be separated from the aspects of the application/component that interact with a user.

Some software architectures use virtual machines. In the example of FIG. 9, this is illustrated by a virtual machine 910. The virtual machine 910 creates a software environment where applications/components can execute as if they were executing on a hardware machine (such as the machine 1000 of FIG. 10, for example). The virtual machine 910 is hosted by a host operating system (e.g., the operating system 902 in FIG. 9) and typically, although not always, has a virtual machine monitor 960, which manages the operation of the virtual machine 910 as well as the interface with the host operating system (e.g., the operating system 902). A software architecture executes within the virtual machine 910 such as an operating system (OS) 936, libraries 934, frameworks 932, applications 930, and/or a presentation layer 928. These layers of software architecture executing within the virtual machine 910 can be the same as corresponding layers previously described or may be different.

Figure 10:
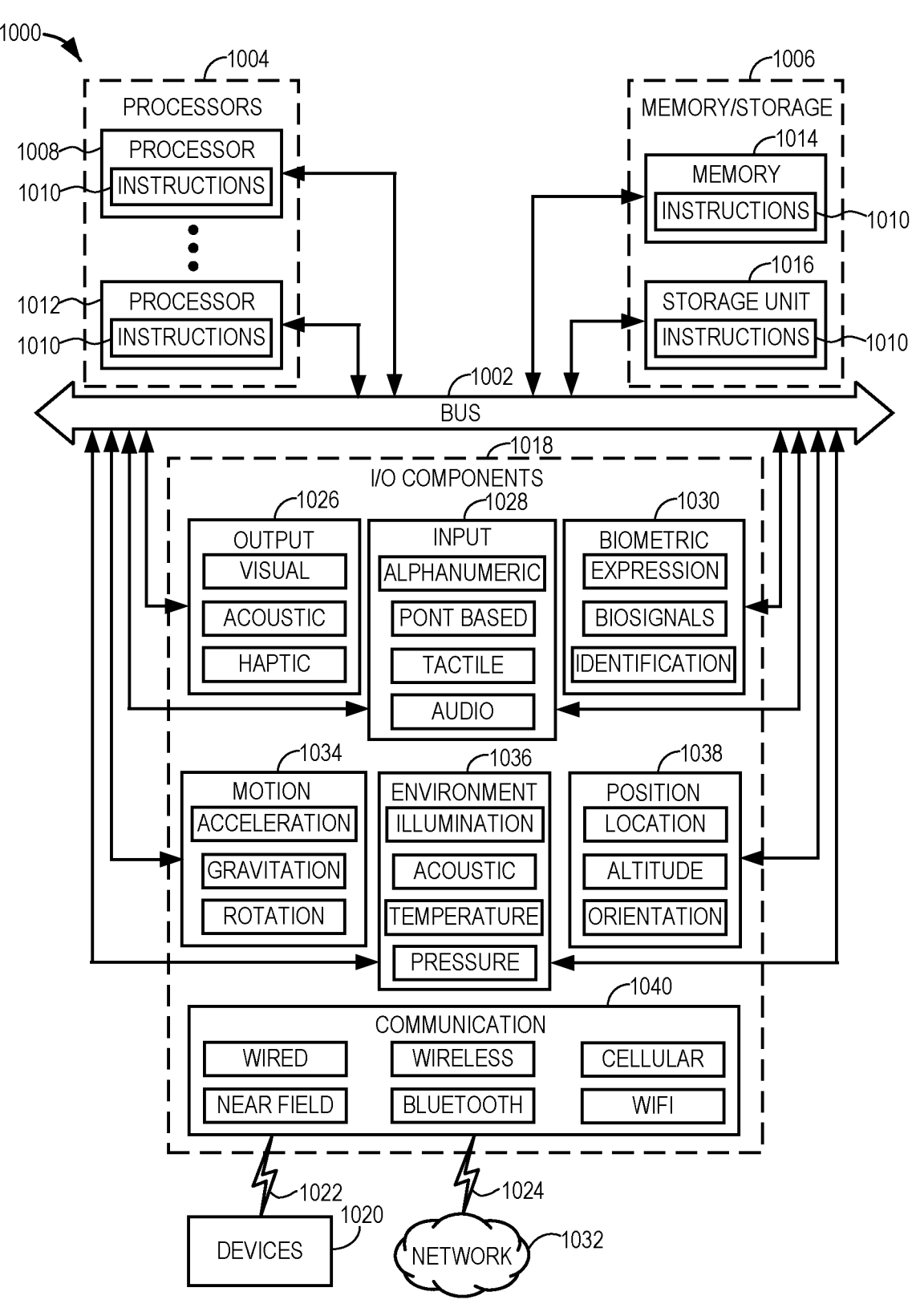
FIG. 10 is a block diagram illustrating components of a machine, according to some example embodiments, that is able to read instructions from a machine-readable medium (e.g., a machine-readable storage medium) and perform any one or more of the methodologies discussed herein.

FIG. 10 is a block diagram illustrating components of a machine 1000, according to some example embodiments, that is able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code), for causing the machine 1000 to perform any one or more of the methodologies discussed herein, may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by the machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004 (including processors 1008 and 1012), memory/storage 1006, and I/O components 1018, which may be configured to communicate with each other such as via a bus 1002. The memory/storage 1006 may include a memory 1014, such as a main memory or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of the processors 1004 are examples of machine-readable media.

The I/O components 1018 may include a wide variety of components to receive input, provide output, produce output, transmit information, exchange information, capture measurements, and so on. The specific I/O components 1018 that are included in a particular machine will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion; the grouping is in no way limiting. In various example embodiments, the I/O components 1018 may include output components 1026 and input components 1028. The output components 1026 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environment components 1036, or position components 1038, among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1034 may include acceleration sensor components (e.g., accelerometer), gravitation sensor components, rotation sensor components (e.g., gyroscope), and so forth. The environment components 1036 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1038 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040, operable to couple the machine 1000 to a network 1032 or devices 1020 via a coupling 1024 and a coupling 1022, respectively. For example, the communication components 1040 may include a network interface component or other suitable device to interface with the network 1032. In further examples, the communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geo-location, location via Wi-Fi® signal triangulation, location via detecting an NFC beacon signal that may indicate a particular location, and so forth.

"Carrier Signal" in this context refers to any intangible medium that is capable of storing, encoding, or carrying instructions for execution by a machine, and includes digital or analog communication signals or other intangible media to facilitate communication of such instructions. Instructions may be transmitted or received over a network using a transmission medium via a network interface device and using any one of a number of well-known transfer protocols.

"Client Device" or "Electronic Device" in this context refers to any machine that interfaces to a communications network to obtain resources from one or more server systems or other client devices. A client device may be, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, or any other communication device that a user may use to access a network.

"Customer's Electronic Device" or "Electronic User Device" in this context refers to a client device that a customer uses to interact with a merchant. Examples of this device include a desktop computer, a laptop computer, a mobile device (e.g., smart phone, tablet), and a game console. The customer's electronic device may interact with the merchant via a browser application that executes on the customer's electronic device or via a native app installed onto the customer's electronic device. The client-side application executes on the customer's electronic device.

"Communications Network" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"Component" in this context refers to a device, physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service"

(SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device, or other tangible medium able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor" in one context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

In another context, a "Processor" is a company (often a third party) appointed to handle payment card (e.g., credit card, debit card) transactions. They have connections to various card networks and supply validation and settlement services to merchants or payment service providers. In aspects, they can also move the money from an issuing bank to a merchant or acquiring bank.

"Card Network" (or "Card Association") in this context refers to financial payment networks such as Visa®, MasterCard®, American Express®, Diners Club®, JCB®, and China Union-Pay®.

"Acquiring Bank" or "Acquirer" in this context refers to a bank or financial institution that accepts credit and/or debit card payments from affiliated card networks for products or services on behalf of a merchant or payment service provider.

"Card Issuing Bank" or "Issuing Bank" in this context refers to a bank that offers card network or association-branded payment cards directly to consumers. An issuing bank assumes primary liability for the consumer's capacity to pay off debts they incur with their card.

"Payment Information" includes information generally required to complete a transaction, and the specific type of information provided may vary by payment type. Some payment information will be sensitive (e.g., the card validation code), while other information might not be (e.g., a zip code). For example, when a payment is made via a credit card or debit card, the payment information includes a primary account number (PAN) or credit card number, card validation code, and expiration month and year. In another payment example, made using an Automated Clearinghouse (ACH) transaction for example, the payment information includes a bank routing number and an account number within that bank.

"Merchant" in this context refers to an entity that is associated with selling or licensing products and/or services over electronic systems such as the Internet and other computer networks. The merchant may be the direct seller/licensor, or the merchant may be an agent for a direct seller/licensor. For example, entities such as Amazon® sometimes act as the direct seller/licensor, and sometimes act as an agent for a direct seller/licensor.

"Merchant Site" in this context refers to an e-commerce site or portal (e.g., website, or mobile app) of the merchant. In some embodiments, the merchant and merchant servers are associated with the merchant site. The merchant site is associated with a client-side application and a server-side application.

"Payment Processor" in this context refers to an entity or a plurality of entities and associated software components and/or hardware components (e.g., hardware processors, virtual processors executing on top of hardware processors, servers, computing platforms, storage, security mechanisms, encryption hardware/devices), among other types of computing resources (e.g., network, bandwidth, CPU processing, and the like) that facilitate and process a transaction, for example between a merchant and a customer's electronic device.

"Native Application" or "native app" in this context refers to an app commonly used with a mobile device, such as a smart phone or tablet. When used with a mobile device, the native app is installed directly onto the mobile device. Mobile device users typically obtain these apps through an online store or marketplace, such as an app store (e.g., Apple's App Store, Google Play store). More generically, a native application is designed to run in the computer environment (machine language and operating system) that it is being run in. It can be referred to as a "locally installed application." A native application differs from an interpreted application, such as a Java applet, which may require interpreter software. A native application also differs from an emulated application that is written for a different platform and converted in real time to run, and a web application that is run within the browser.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2011-2022, Stripe, Inc., All Rights Reserved.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for dynamic selection of systems when routing electronic requests to reduce latencies, the method comprising:

receiving, by at least one processor, an electronic request from a device of a first entity, the electronic request corresponding to a request for information stored by a first institution;

identifying, by the at least one processor, a routing context associated with the electronic request, the routing context corresponding to aspects of the request that are involved in determining routing choices;

determining, by the at least one processor, a plurality of service provider devices that have an association with the first institution based on the routing context;

identifying, by the at least one processor, a plurality of network operation events generated within a period of time in response to a plurality of electronic requests processed by the plurality of devices during the period of time;

aggregating, by the at least one processor, the plurality of events into a plurality of time windows associated with the period of time, where each network operation event is aggregated with a respective time window of the plurality of time windows based on a time of occurrence of each network operation;

executing, by the at least one processor, a machine learning model to determine a data protection attribute by providing profile data associated with a user profile to the machine learning model to cause the machine learning model to generate an output indicating the the data protection attribute and an importance level of data protection associated with the user profile;

calculating, by the at least one processor, a performance metric for each device of the plurality of devices corresponding to the service providers in each of the plurality of time windows, the performance metric representing a weighted sum that is based on at least one weighted performance factor, the weighted performance factor representing data of the service providers communicated by the plurality of service provider devices when executing the plurality of electronic requests within the plurality of time windows, and at least one weighted preference factor, the at least one weighted preference factor representing the data protection attribute weighted according to the importance level of data protection;

determining, by the at least one processor, one time window of the plurality of time windows associated with the electronic request based on a time of receipt associated with the electronic request; and responsive to determining, by the at least one processor, a routing choice that optimizes execution of the electronic request within the one time window of the plurality of time windows based at least on the performance metric, the routing choice indicating a device of a first service provider of the plurality of service providers that satisfies the at least one weighted performance factor and the data protection attribute weighted according to the importance level of data protection, routing, by the at least one processor, the electronic request to the device of the first service provider based on a current time, the routing context, and the routing choice.

2. The method of claim 1, wherein the calculating the performance metric for each device of the plurality of devices corresponding to the service provider includes determining an entity category corresponding to the first entity.

3. The method of claim 1, wherein the routing is further based on preferences set by an entity sending the electronic request, the entity having received the electronic request from an end user.

4. The method of claim 1, further comprising:

determining one or more preferences corresponding to an end user of the first entity; and in response to receiving the information requested by the electronic request from the first service provider, abstracting a first portion of the information and providing the information including the abstracted first portion to the first entity.

5. The method of claim 4, further comprising training the machine learning model to be used in the routing process by:

obtaining historical electronic request processing information;

transforming the historical electronic request processing information into training data by modifying one or more fields of data in the historical electronic request processing information;

using a machine learning algorithm to train the machine learning model using the training data, the training including:

setting values for a plurality of weights to be applied to fields of the training data;

applying the plurality of weights with set values to corresponding values of fields in the training data;

measuring results of the applying against a loss function; and altering the values for the plurality of weights based on the measuring.

6. The method of claim 1, wherein generating the output indicating the data protection attribute further comprises executing the machine learning model based on an electronic request history included in the profile data.

7. The method of claim 1, wherein the data protection attribute is generated based on at least one of an explicit preference included the profile data and a jurisdiction indicated by the profile data.

8. A system for dynamic selection of systems when routing electronic requests to reduce latencies, the system comprising:

one or more processors;

a non-transitory computer-readable medium storing instructions that, when executed by at least one processor among the one or more processors, cause the at least one processor to perform operations comprising:

receiving, from a first entity, an electronic request corresponding to a request for information stored by a first institution;

identifying a routing context associated with the electronic request, the routing context corresponding to aspects of the request that are involved in determining routing choices;

determining a plurality of service provider devices that have an association with the first institution based on the routing context;

identifying a plurality of network operation events generated within a period of time in response to a plurality of electronic requests processed by the plurality of devices during the period of time;

aggregating the plurality of events into a plurality of time windows associated with the period of time, where each network operation event is aggregated with a respective time window of the plurality of time windows based on a time of occurrence of each network operation;

executing a machine learning model to determine a data protection attribute by providing profile data associated with a user profile to the machine learning model to cause the machine learning model to generate an output indicating the data protection attribute and an importance level of data protection associated with the user profile;

calculating a performance metric for each device of the plurality of devices corresponding to the service providers in each of the plurality of time windows, the performance metric representing a weighted sum that is based on at least one weighted performance factor, the weighted performance factor representing data of the service providers communicated by the plurality of service provider devices when executing the plurality of electronic requests within the plurality of time windows, and at least one weighted preference factor, the weighted preference factor representing the data protection attribute weighted according to the importance level of data protection;

determining one time window of the plurality of time windows associated with the electronic request based on a time of receipt associated with the electronic request; and responsive to determining a routing choice that optimizes execution of the electronic request within the one time window of the plurality of time windows, based at least on the performance metric, the routing choice indicating a device of a first service provider of the plurality of service providers that satisfies the at least one weighted performance factor and the data protection attribute weighted according to the importance level of data protection, routing the electronic request to the device of a first service provider based on a current time, the routing context, and the routing choice.

9. The system of claim 8, wherein the routing context includes one or more preferences corresponding to the first entity.

10. The system of claim 8, wherein the routing context includes a transaction location.

11. The system of claim 8, wherein the calculating the performance metric for each service providers includes determining an entity category corresponding to the first entity.

12. The system of claim 8, wherein the routing is further based on preferences set by an entity sending an authorization request, the entity having received the authorization request from an end user.

13. The system of claim 8, wherein the operations further comprise:

determining one or more preferences corresponding to an end user of the first entity; and in response to receiving the information requested by the electronic request from the first service provider, abstracting a first portion of the information and providing the information including the abstracted first portion to the first entity.

14. The system of claim 13, further comprising training a machine learning model to be used in the routing process by:

obtaining historical electronic request processing information;

transforming the historical electronic request processing information into training data by modifying one or more fields of data in the historical electronic request processing information;

using a machine learning algorithm to train the machine learning model using the training data, the training including:

setting values for a plurality of weights to be applied to fields of the training data;

applying the plurality of weights with set values to corresponding values of fields in the training data;

measuring results of the applying against a loss function; and altering the values for the plurality of weights based on the measuring.

15. A non-transitory machine-readable medium comprising instructions which, when read by a machine, cause the machine to perform operations for dynamic selection of systems when routing electronic requests to reduce latencies, the operations comprising:

receiving, from a first entity, an electronic request from a device of a first entity, the electronic request corresponding to a request for information stored by a first institution;

identifying a routing context associated with the electronic request, the routing context corresponding to aspects of the request that are involved in determining routing choices;

determining a plurality of service provider devices that have an association with the first institution based on the routing context;

identifying a plurality of network operation events generated within a period of time in response to a plurality of electronic requests processed by the plurality of devices during the period of time;

aggregating the plurality of events into a plurality of time windows associated with the period of time, where each network operation event is aggregated with a respective time window of the plurality of time windows based on a time of occurrence of each network operation;

executing a machine learning model to determine a data protection attribute by providing profile data associated with a user profile to the machine learning model to cause the machine learning model to generate an output indicating the data protection attribute and an importance level of data protection associated with the user profile;

calculating a performance metric for each service provider in each of the plurality of time windows, the performance metric representing a weighted sum that is based on at least one weighted performance factor, the weighted performance factor representing data of the service providers communicated by the plurality of service provider devices when executing the plurality of electronic requests within the plurality of time windows, and at least one weighted preference factor, the weighted preference factor representing the data protection attribute weighted according to the importance level of data protection;

determining one time window of the plurality of time windows associated with the electronic request based on a time of receipt associated with the electronic request; and responsive to determining a routing choice that optimizes execution of the electronic request within the one time window of the plurality of time windows based at least on the performance metric, the routing choice indicating a device of a first service provider of the plurality of service providers that satisfies the at least one weighted performance factor and the data protection attribute weighted according to the importance level of data protection, routing the electronic request to the device of the first service provider based on a current time, the routing context, and the routing choice.

16. The non-transitory machine-readable medium of claim 15, wherein the routing context includes one or more preferences corresponding to the first entity.

17. The non-transitory machine-readable medium of claim 15, wherein the routing context includes a transaction location.

18. The non-transitory machine-readable medium of claim 15, wherein the calculating the performance metric for each device of the plurality of devices corresponding to the service providers includes determining an entity category corresponding to the first entity.

19. The non-transitory machine-readable medium of claim 15, wherein the routing is further based on preferences set by an entity sending an authorization request, the entity having received the authorization request from an end user.

20. The non-transitory machine-readable medium of claim 15, wherein the operations further comprise:

determining one or more preferences corresponding to an end user of the first entity; and in response to receiving the information requested by the electronic request from the first service provider, abstracting a first portion of the information and providing the information including the abstracted first portion to the first entity.

* * * * *